United States Patent [19]
Walton

[11] 4,219,326
[45] Aug. 26, 1980

[54] GLASS MELTING FURNACE STRUCTURE

[75] Inventor: Ronald O. Walton, Toledo, Ohio

[73] Assignee: Libbey-Owens-Ford Company, Toledo, Ohio

[21] Appl. No.: 28,201

[22] Filed: Apr. 9, 1979

[51] Int. Cl.² ............................................. F27D 1/00
[52] U.S. Cl. ..................................... 432/247; 65/339; 65/342
[58] Field of Search ...................... 432/247, 249, 252; 65/339, 342, 345, 346

[56] References Cited

U.S. PATENT DOCUMENTS

| | | | |
|---|---|---|---|
| 2,119,948 | 6/1938 | Blau et al. ........................ | 432/249 X |
| 2,585,552 | 2/1952 | Hosbein .............................. | 432/252 |
| 2,987,856 | 6/1961 | Longenecker ...................... | 432/252 |
| 3,399,046 | 8/1968 | Longenecker ...................... | 432/345 X |
| 3,888,195 | 6/1975 | Longenecker ...................... | 432/252 |
| 4,001,001 | 1/1977 | Knavish et al. ...................... | 65/347 |

Primary Examiner—John J. Camby

Attorney, Agent, or Firm—Collins, Oberlin & Darr

[57] ABSTRACT

A waist construction for a tank-type glass melting furnace having a lower tank covered by an independently supported sprung arch roof. The side walls forming the lower tank are inset for defining a waist section having a reduced passage interconnecting the melting and conditioning zones of the furnace. An open framework is provided above the inset breast walls for suspending portions of upright closure walls closing the ends of the melting and working zones adjacent the entrance and exit ends of the reduced passage; the suspended portions extending across the entrance and exit ends of the reduced passage closely adjacent the upper surface of the molten glass therein. The suspended portion of each wall is centrally located and flanked by bottom supported wing walls. Additionally, a segmented, suspended cover is provided between the suspended portions of the upright closure walls for enclosing the open top region of the reduced passage.

7 Claims, 11 Drawing Figures

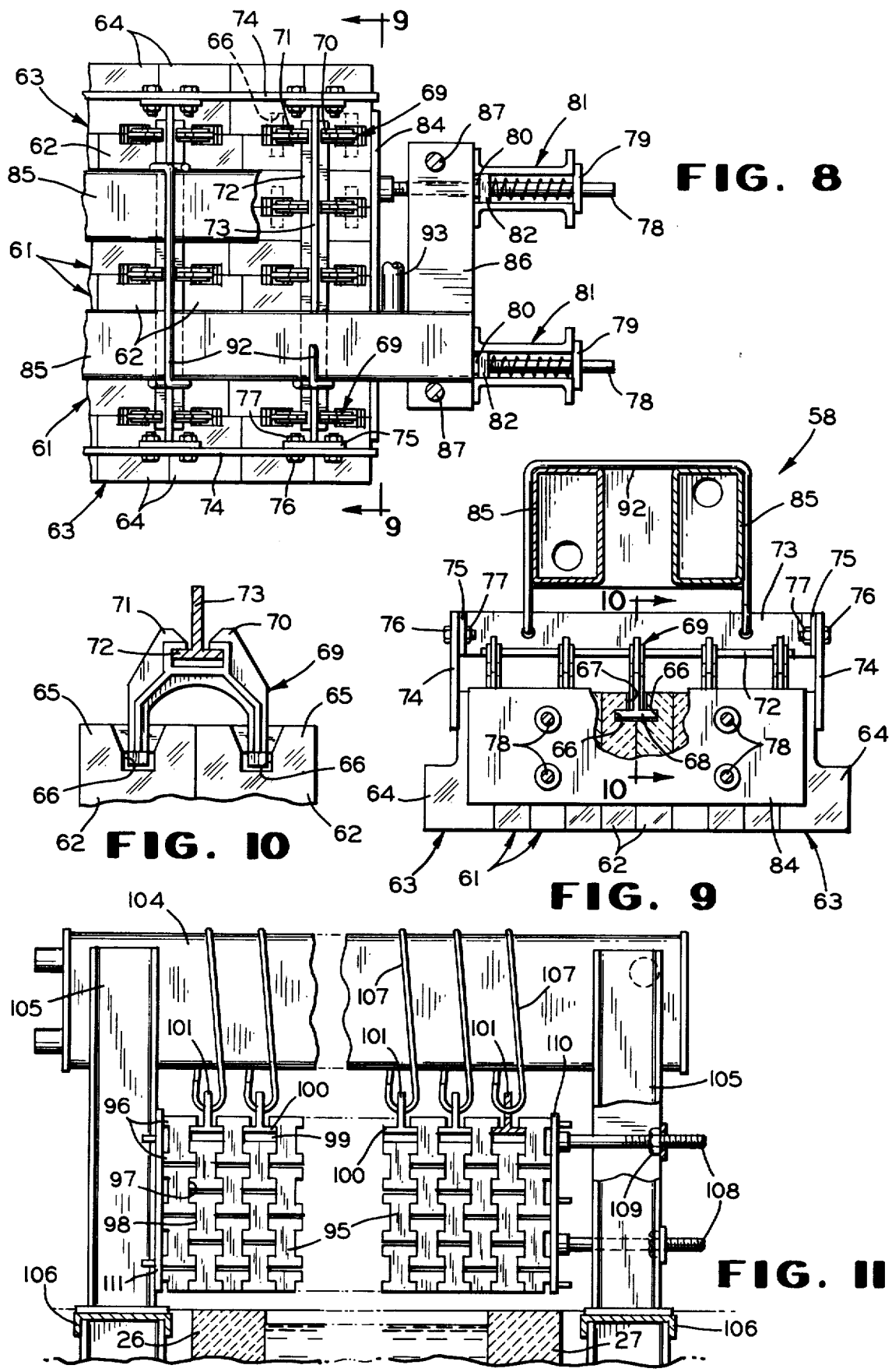

GLASS MELTING FURNACE STRUCTURE

BACKGROUND OF THE INVENTION

1. Field of the Invention

This invention generally relates to continuous tank-type glass melting furnaces and, more particularly, to the construction of such furnaces having reduced waist sections interconnecting the melting and conditioning zones thereof.

2. Description of the Prior Art

In a continuous, tank-type glass melting furnace, raw batch material and scrap glass or cullet are charged into one end of the furnace and molten glass is removed from its other end. The glass, in moving through the furnace, passes successively through melting, refining, conditioning or cooling and working zones which are contiguous with one another. Heat is applied over the upper surface of the bath of glass in the melting zone for reducing the newly added materials to a molten state and integrating them into the flowing molten mass, and the molten glass mass is refined and cooled to a point where it can be removed from the working zone in a continuous ribbon.

Conventionally, one such type of furnace is constructed with a lower tank section covered by an independently supported roof section wherein the central region of the tank section is provided with a reduced waist which provides a passage intermediate the ends of the tank. This construction, in effect, forms separate melting and conditioning or cooling tanks interconnected by a passage that is slightly smaller in width than the tanks so that the melting operation can be performed to best suit conditions in the melting tank without affecting the molten glass in the working tank. The size of the waist and, of course, the passage, is determined by the output and the operating conditions of the melting furnace. The tanks are of constant depth and the width of the tanks is constant except for the waist section where the side walls are inset to provide the narrow region interconnecting the melting zone to the conditioning zone for improving the homogenity of the glass in the working zone.

It is common practice to cover the melting and conditioning sections with separate, suitably sized sprung arch roofs wherein the central portions of upright walls closing the ends of the melting and conditioning sections at the waist, are supported on sprung arches. As is known, the sprung arches spring from skews set on heel plates firmly attached to buck stays forming part of the furnace superstructure. Normally the arches are built up of individual tapered like-size bricks by dipping the individual bricks in a siliceous mortar and setting them in place on a form supported by scaffolding. When the form on which the arches have been laid during construction is removed, the slight elastic yielding of the buck stays and the tie rods together with the bedding in of the contacting surfaces of adjacent bricks against each other, allows the crown of the arches to drop slightly and small gaps to open between the lower ends of the bricks. Accordingly, the portion of the walls supported by the sprung arches will also drop.

It is the usual practice in glass melting furnaces to construct the walls and arches of silica bricks which are quite heavy, i.e. a brick 9" (229 mm)×6" (152 mm)×3" (76 mm) weighs approximately 9 pounds. At this point, it should be noted that the wall portions supported by the roof arches are on the order of fourteen feet (4.27 m) wide, have a height of about ten feet (3.05 m) and are approximately one and one-half feet (0.46 m) thick. Conventionally, these wall portions are built up of a number of individual courses of refractory brick, and wall portions of sufficient size weigh in the neighborhood of 12,000 (5443 kg.) pounds, which would be supported by the roof arches.

Also, it should be noted that refractory bricks, formed of silica, exhibit their maximum thermal expansion at low temperatures. Newly constructed furnaces, as above-described, are often very damp and they are slowly dried out over a period of time (ten to twelve days) by temporary burners such as salamanders placed at convenient locations about the furnace. During this time, the temperature throughout the furnace including the walls and the arch roofs will not be uniform. Accordingly, it may be found that the bricks, when the furnace is heated-up, expand at different times or rates and that the walls and arch roofs may warp during the drying out period by rising unequally in one part or another with respect to the plane of symmetry of the tank. Consequently, as heating occurs and the bricks dry out, some may become sufficiently loose in the roof arches to drop therefrom, thus permitting the supported portion of the upright closure walls to collapse into the interior of the waist section or, if the arches do not collapse, the walls to buckle and rupture.

SUMMARY OF THE INVENTION

Generally speaking, the present invention overcomes the aforementioned problems by constructing the walls enclosing the ends of the melting and working tanks adjacent the entrance and exit ends of the waist section with central suspended portions which do not require support from the bottom such as by the sprung arches. More specifically, each upright closure wall adjacent the entrance and exit ends of the waist section comprises a central suspended portion flanked by bottom supported wing walls wherein the suspended portion spans the passage defined by the waist side walls. Further, the invention contemplates employing I-shaped bricks which can be assembled to form a chain wall portion adapted to be suspended over the passage of the waist.

Additionally, the invention contemplates employing a segmented, flat cover suspended from above the waist for enclosing the passage lying between the entrance and exit ends of the waist section.

OBJECTS AND ADVANTAGES

Accordingly, an object of the invention is to provide a tank-type glass melting furnace with a waist construction wherein the portions of upright closure walls extending over the waist, are not subjected to deflection stress and subsequent collapsing.

Another object of the invention is to mount the central portions of the upright closure walls in a manner which do not subject the ends of the waist cover to compressive forces.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 8 is an enlarged fragmentary plan view, taken substantially along line 8—8 of FIG. 7;

FIG. 9 is an enlarged elevational view, partly in section, and taken substantially along line 9—9 of FIG. 8;

FIG. 10 is an enlarged sectional view, taken substantially along line 10—10 of FIG. 9; and FIG. 11 is an enlarged transverse elevation view, taken substantially along line 11—11 of FIG. 2, illustrating the flat L-shaped waist cover.

DESCRIPTION OF THE PREFERRED EMBODIMENT

Figure 1:
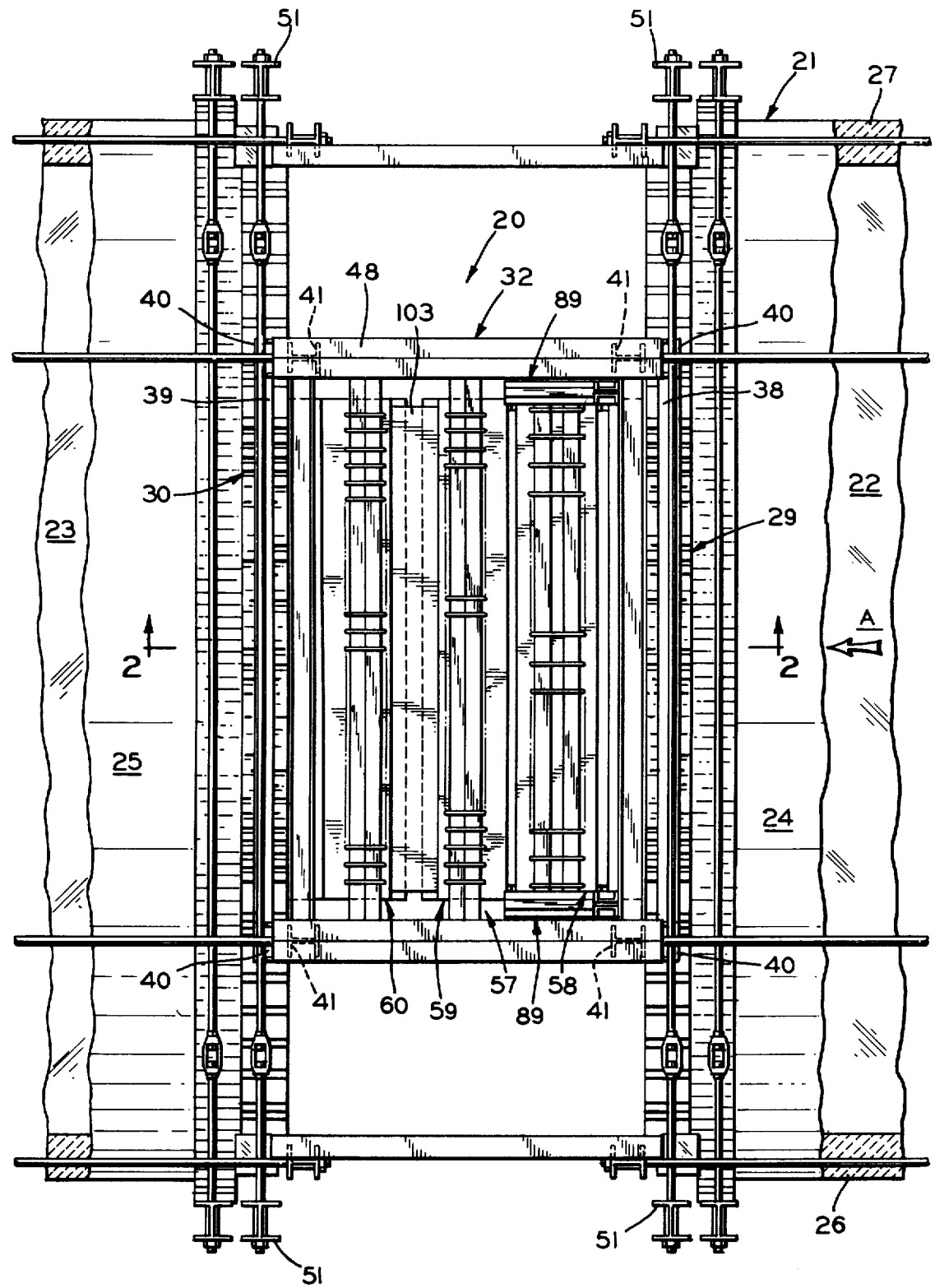
FIG. 1 is a plan view of a portion of a furnace embodying the invention and illustrating a reduced waist section interconnecting its melting and conditioning tanks.

Referring now to the drawings, and in particular to FIG. 1 thereof, there is shown generally at 20 a waist section, constructed in accordance with the invention, of a continuous tank-type glass melting furnace (only a portion shown).

Generally, the glass melting furnace comprises a lower longitudinally extending refractory tank indicated generally at 21 which is divided into a melting zone 22 and a working zone 23 by the waist section 20 in a manner known per se. The melting and working zones 22 and 23 are covered by independently supported sprung arch roofs 24 and 25, respectively. Generally, the tank 21 is formed with a floor (not shown) opposed side walls 26 and 27 and is of constant depth along its length. The width of the tank 21 is constant, except for the waist section 20 where the walls 26 and 27 are inset to provide a reduced passage 28 interconnecting the melting zone 22 to the conditioning zone 23.

As is well known, raw glass making materials, i.e. batch and cullet or scrap glass, are introduced into the doghouses (not shown) connected to the tank 21 by feeder devices (not shown) and reduced to a molten state in the melting zone 22. From the melting zone 22, the molten body of glass flows in the direction of arrow A through the reduced passage 28 into the conditioning zone 23 and is thereafter removed from the exit end (not shown) of the tank 21.

Figure 2:
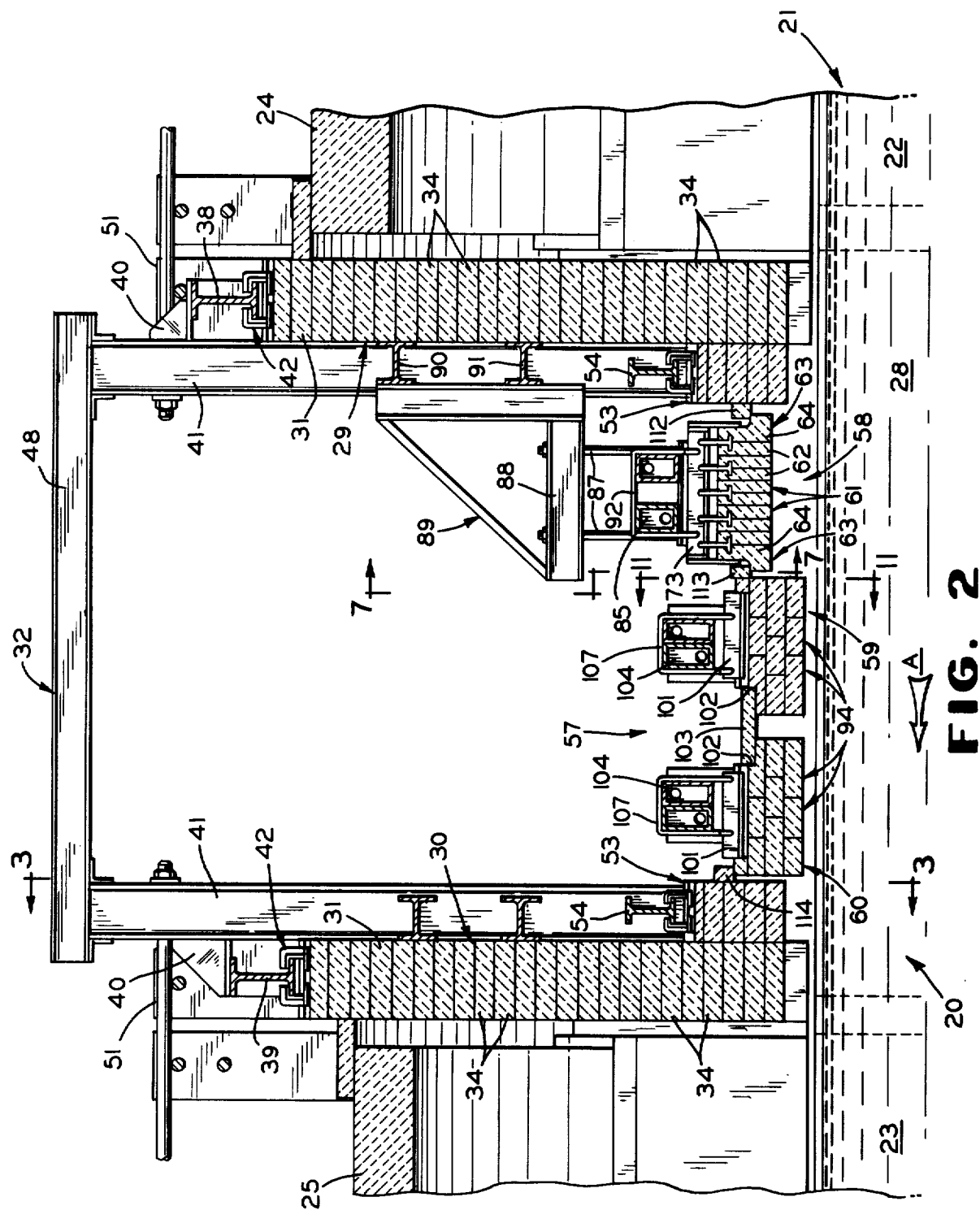
FIG. 2 is an elevational sectional view, taken substantially along line 2—2 of FIG. 1.
Figure 3:
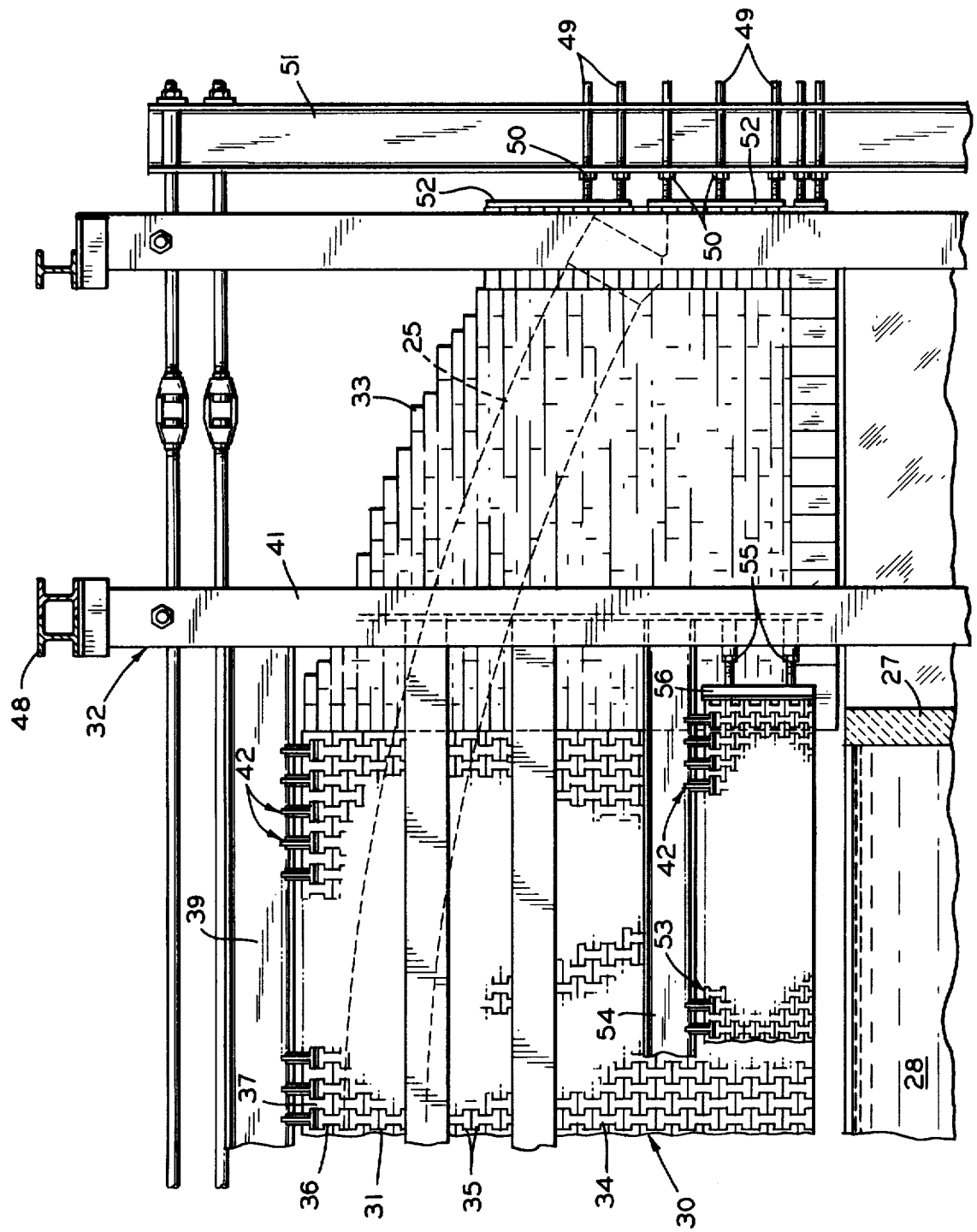
FIG. 3 is an enlarged fragmentary view taken substantially along line 3—3 in FIG. 2 illustrating the upright closure wall of the working tank at the downstream end of the waist section.

As previously mentioned, the melting and conditioning zones of the tank 21 are covered by the sprung arch roofs 24 and 25, the open ends of which, adjacent the waist section 20, are enclosed by upright walls 29 and 30, respectively, for forming substantially closed chambers in which the previously described glass melting and conditioning operations occur. According to the present invention, the problems of deflecting, rupturing, and/or collapsing of the upright closure walls 29 and 30 at the waist section are successfully overcome by constructing the walls with suspended sections which overlie the entrance and exit ends of the passage 28 defined by the waist 20. As illustrated in FIGS. 2 and 3, this is accomplished by sectionalizing each wall 29 and 30 for providing a central section 31 suspended from an open framework structure indicated generally at 32 and flanking each side of the suspended wall section 31 with a wing wall 33. Each wing wall is supported in a manner known per se, on a longitudinally extending plate (not shown) above the inset portions of the side breast walls 26 and 27.

Referring now to FIG. 3, each suspended section 31 is comprised of a plurality of courses of I-shaped refractory suspension blocks 34, each having flanged end portions 35. Each course of the suspension blocks 34 is laid in a manner to provide a transverse recess 36 having a throat section 37 for interfitting with the flange portions 35 of the adjacent course of suspension blocks 34. Preferably, the top two courses of the suspension blocks 34 are formed from a bonded alumina-zirconia-silica material for strengthening the suspended section 31. However, if the extra strength is not required in the top two courses, all the courses may be formed from a silica material. The joints between the suspension blocks 34 are rendered substantially gas tight by a compressive force applied at each vertically extending side of the section 31 as will be described in detail hereinafter.

Figure 4:
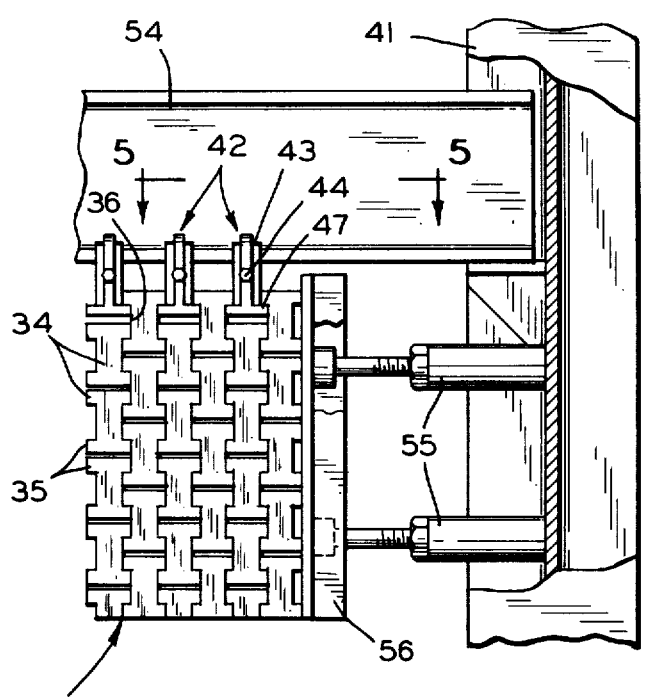
FIG. 4 is an enlarged fragmentary transverse view, looking in the direction of the working tank and illustrating an end of a short wall lying adjacent the upright cosure wall illustrated in FIG. 3.
Figure 5:
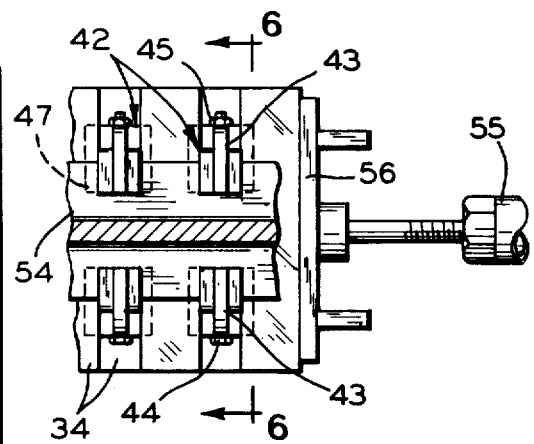
FIG. 5 is an enlarged fragmentary view taken substantially along line 5—5 of FIG. 4.
Figure 6:
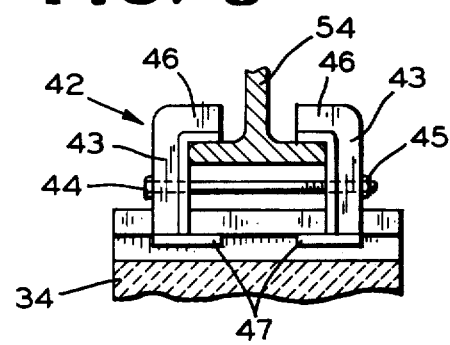
FIG. 6 is an enlarged fragmentary view taken substantially along line 6—6 of FIG. 5.

Referring now to FIGS. 1, 2 and 3, the open frame structure 32 for suspending each section 31 generally comprises two parallel spaced-apart horizontally disposed structural H-beams 38 and 39 extending transversely across the waist section 20, one 38 at its entrance end and the other 39 at its exit end, the beams being supported at each of their ends on brackets 40 affixed to transversely opposed pairs of vertical support columns 41. The upper course of the suspension blocks 34 of each wall section 31 is made to depend from its respective beams 38 and 39 as by means of conventional hangers 42. As best illustrated in FIGS. 4, 5 and 6, each of the hangers 42 has a pair of identical oppositely disposed carrier members 43 joined by removable bolts 44 and a nut 45 (see FIG. 6). The carrier members, in turn, have upper portions 46 turned inwardly at approximately right angles extending toward each other and adapted to engage the lower flange of the main support I-beams 38 and 39. Lower inverted T-shaped portions 47 of the carrier members extending longitudinally of the main beams 38 and 39 (see FIG. 4), are adapted to span the recess 36 between the upper course of the suspension blocks 34. The upper ends of each transverse pair of columns 41 are connected together by a pair of horizontal, longitudinally extending I-beams 48 (see FIG. 2) to lend rigidity to the open frame structure 32.

As previously indicated, the joints between the suspension blocks 34 are rendered gas-tight by applying a compressive force against each vertical side of the suspended sections 31. As shown in FIG. 3, this may be accomplished by providing a plurality of screw threaded push rods 49 mounted in nuts 50 fixed to columns 51 forming part of the furnace structure. The push rods bear against pressure plates 52 bearing against each free vertical edge of the wing walls 33, the wing walls in turn transmitting the applied compressive force against the vertical sides of the suspended section 31.

Referring now to FIG. 2, a transversely extending depending refractory curtain member 53 is provided adjacent the bottom portion of each upright wall 29 and 30 for covering the passage 28 in this region of the waist. Each depending curtain member 53 comprises a plurality of courses, in this instance five, of the suspension blocks 34 assembled as in the previously described manner. Each member 53 is suspended from the bottom flange of an I-beam 54 extending transversely between and affixed to transversely opposed pairs of the vertical support columns 41. In the manner previously described, the suspension blocks 34 are held in assembled relationship and the joints therebetween are rendered gas-tight by applying a compressive force against either vertical side of the members 53. As particularly shown in FIGS. 4 and 5, this may be accomplished by providing a pair of screw threaded bolts or bottle jacks 55 which bear between the vertical support columns 41 and a pressure plate 56 bearing against the free vertical sides of the members 53.

As best illustrated in FIGS. 1 and 2, a preferred cover structure, indicated by the reference numeral 57, generally comprises a transversely extending flat inverted T-shaped cover 58 suspended adjacent the entrance end of the passage 28 and a pair of suspended, transversely extending, spaced-apart opposed, flat L-shaped covers 59 and 60 adapted to accommodate the stirring arrangement. As best illustrated in FIG. 2; the inverted T-shaped cover 58 is installed at the entrance end of the passage 28 and the L-shaped covers 59 and 60 are installed between the T-shaped cover and the exit end of the passage, all with expansion gaps therebetween. The spaced-apart L-shaped covers 59 and 60 are installed in opposed relationship to each other, the purpose of which will be described in detail hereinafter.

Figure 7:
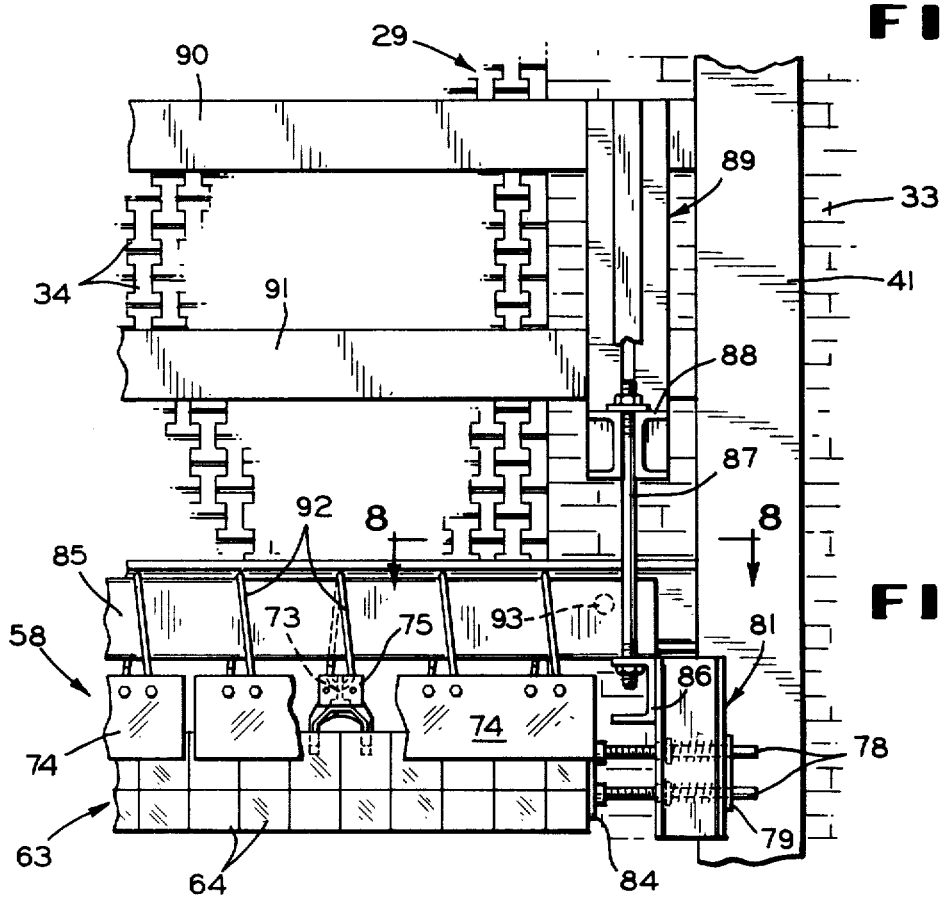
FIG. 7 is an enlarged fragmentary elevational view taken substantially along line 7—7 of FIG. 2 and illustrating the flat T-shaped waist cover.

As best shown in FIGS. 2 and 9, the inverted T-shaped cover 58 generally comprises a plurality of transversely extending, overlapping inner rows 61 of like-shaped refractory blocks 62 and a pair of outer rows 63 of L-shaped refractory blocks 64. Referring now to FIGS. 8, 9 and 10, each of the blocks 62 and 64 have an upper recessed side 65 and the blocks 62 and 64 are laid in a manner to provide transverse recesses 66 having throat sections 67 therebetween for interfitting with T-sections 68 of conventional hangers 69. As best shown in FIGS. 8 and 10, each of the hangers 69 has upper portions 70 and 71 turned inwardly at approximately right angles extending toward each other and adapted to engage the lower flanges 72 of T-shaped mounting rails 73. As best shown in FIGS. 7, 8 and 9, the rows 61 and 63 of the refractory blocks are held in assembled relationship by a plurality of side plates 74 affixed to flanges 75 provided at each end of the rails 73 as by bolts 76 and nuts 77.

The joints between adjacent blocks 62-62 and 64-64 are rendered substantially gas tight by applying a compressive force at either end of the rows 61 and 63 of the T-shaped cover 58. As shown in FIGS. 7 and 8, this may be accomplished by providing a plurality of spring loaded bolts 78 free to move axially in and out of aligned openings in the plates 79 and 80 affixed to two pairs of spaced apart vertical support members 81 (which may be conventional structural channels located at either side of the waist section 20). The bolts 78 may be provided with threadedly attached square nuts 82 for slidably engaging the pair of vertical support members 81. Thus, the bolts 78 have compression springs 83 held by the threadedly attached nuts 82 located intermediate the pair of members 81 such that as the nuts are tightened, the corresponding springs are compressed and the reaction forces the bolts against corresponding pressure plates 84 provided at either end of the flat cover 58. The resilience of the springs also allows some degree of transverse movement without loss of the gas-tight quality of the joints; for example, during expansion and contraction of the refractory cover 58.

As illustrated in FIGS. 7, 8 and 9, the T-shaped refractory cover 58 support system contemplates suspending the T-shaped rails 73 from a pair of spaced-apart transversely extending horizontally disposed tubular sections 85 which, in turn, are supported at either end outside the waist section 20 as by channel members 86 affixed to vertically depending support rods 87. As best illustrated in FIGS. 2 and 7, the support rods 87 depend from the base members 88 of a pair of triangular frames 89 (FIG. 2) affixed to a pair of spaced-apart, transversely extending horizontal beams 90 and 91. The ends of each beam 90 and 91 are affixed to the pair of transversely opposed columns 41 (see FIG. 2) supporting the section 31 of wall 30 enclosing the end of the melting zone 22. The T-shaped rails 73 may be suspended from the tubular section 85 by means of hanger rods 92 as illustrated in FIGS. 7, 8 and 9. The tubular sections 85 (which may be lengths of standard rectangular structural steel tubing) are closed at both ends and provided with connections (not shown). During normal operation, a fluid cooling medium, such as water, is circulated therethrough in a conventional manner to cool both the tubular sections and the support rails 73. The tubular sections may be interconnected as at 93 (see FIG. 8) to provide a one pass system with inlet and outlet connections on the same side of the waist. Such cooling prevents loss of strength and warpage of both the tubular sections and the mounting rails 73 associated with the high environmental temperature above the waist.

Referring now to FIGS. 2 and 11, each L-shaped cover 59 and 60 is comprised of a plurality of rows 94 and overlapping courses of I-shaped refractory suspension blocks 95, each block having flanged end portions 96. Each row and course of the suspension blocks 95 is laid in a manner to provide a transverse recess 97 having a throat section 98 for interfitting with the flange portions 96 of the adjacent course of suspension blocks 95. As best shown in FIG. 11, the recesses 97 of the upper course of suspension blocks 95 are provided with elongated refractory spacer members 99 for snugly interfitting with flanges 100 of T-shaped mounting rails 101. More specifically, the spacer members 99 are disposed between the bottom flange surface of the rails 101 and the top surfaces of the adjacent course of suspension blocks 95. Referring now to FIG. 2, the opposed surfaces of the end blocks 95 of each cover 59 and 60 are provided with L-shaped recesses 102 for supporting an elongated refractory plate 103 adapted to receive conventional homogenization equipment (not shown). The joints between the I-shaped blocks 95 are rendered substantially gas-tight by applying a compressive force against one vertical side of each cover 59 and 60 as will be described in detail hereinafter.

Referring now particularly to FIG. 11, the support system for each L-shaped cover 59 and 60 contemplates suspending the covers from pairs of transversely extending, horizontal tubular sections 104 which, in turn, are supported at either end outside the waist 20 as by vertical channel members 105 affixed to horizontally disposed supporting rails 106. The T-bar rails 101 are suspended from the tubular sections 104 by hanger rods 107.

More particularly, each T-shaped rail 101 is suspended from one of the transversely extending, horizontally disposed, tubular sections 104. The tubular sections 104 (which may be lengths of standard rectangular structural steel tubing) are closed at both ends and provided with connections (not shown). During normal operation a cooling medium, such as water, is circulated therethrough in a conventional manner to cool both the tubular sections and the T-bar rails 101. The tubular sections may be interconnected in pairs to provide a one pass system with inlet and outlet connections on the same side of the waist. Such cooling prevents loss of strength in and warpage of both the tubular sections 104 and the T-shaped rails 101 associated with the high environmental temperature above the waist 20.

As previously indicated, the joints between the suspension blocks 95 are rendered substantially gas-tight by applying a compressive force against one vertical side of each L-shaped cover 59 and 60. As shown in FIG. 11, this may be accomplished by providing a pair of screw threaded push rods 108 mounted in nuts 109 fixed to the vertical support columns 105. The push rods bear against a pressure plate 110 lying on one vertical side of the suspension blocks 95 while the other vertical side of the suspension blocks bear against a bearing plate 110 affixed to opposed vertical support member 105'.

Referring now to FIGS. 1 and 2, the expansion gap between the T-shaped cover 58 and the suspended member 53 adjacent the entrance or upstream end of the passage 28 may be covered by an elongated refractory member 112 disposed in the recess of the L-shaped block 64. The gap between the side of the T-shaped cover 58 and the L-shaped cover 59 may be covered by an elongated member 113 disposed in the recess of the L-shaped block 64. The gap between the L-shaped cover 60 and the suspended member 53 at the exit or downstream end of the passage may be closed by an elongated refractory member 114 disposed on the top surface of the row of blocks adjacent thereto.

It is to be understood that the form of the invention herewith shown and described, is to be taken as a preferred embodiment of the same, and the various changes in the shape, size and arrangement of parts may be resorted to without departing from the spirit of the invention.

I claim:

1. In a tank-type glass melting furnace structure of the type having a melting zone contiguous with a working zone, an inset breast wall section defining a reduced waist having entrance and exit ends for connecting the melting zone to the working zone, the improvement comprising:
   a. a pair of upright walls, one at each end of the reduced waist section, each said upright wall having a suspended central portion flanked by bottom supported wing wall portions, said suspended central portions extending across the reduced waist section;
   b. an open framework located above the reduced wasit section from which said central portions of said upright walls are suspended; and
   c. means for affixing said suspended central portion of each said upright wall to said open framework.

2. A tank-type glass melting furnace structure as claimed in claim 1, including a pair of depending refractory curtain members, one being disposed adjacent the bottom face of said suspended portion of each said upright wall and extending across the reduced section and means for suspending each said curtain member from said open framework.

3. A tank-type glass melting furnace structure as claimed in claim 1, wherein said framework includes an upper pair of spaced-apart horizontally disposed transversely extending beams and said central portion of a said upright wall comprises a chain wall suspended from one of said horizontally disposed beams.

4. A tank-type glass melting furnace structure as claimed in claim 2, wherein said framework includes a lower pair of spaced-apart horizontally disposed transversely extending beams and each one of said pair of depending members comprises a chain structure suspended therefrom.

5. A tank-type glass melting furnace structure as claimed in claim 2, including a flat cover for enclosing the open portion of the reduced waist section lying between said pair of curtain members.

6. A tank-type glass melting furnace structure as claimed in claim 5, wherein said flat cover is sectionalized and including a framework from which said sections of said cover are suspended between said curtain members.

7. A tank-type glass melting furnace structure as claimed in claims 5 or 6, wherein said flat cover comprises a pair of spaced-apart L-shaped covers disposed adjacent the exit end of said waist section and an inverted T-shaped cover disposed between the free end of said L-shaped covers and the entrance end of said waist section.

* * * * *